July 28, 1953  J. A. DOYEN  2,646,781
VACUUM SPARK CONTROL
Filed Feb. 8, 1951
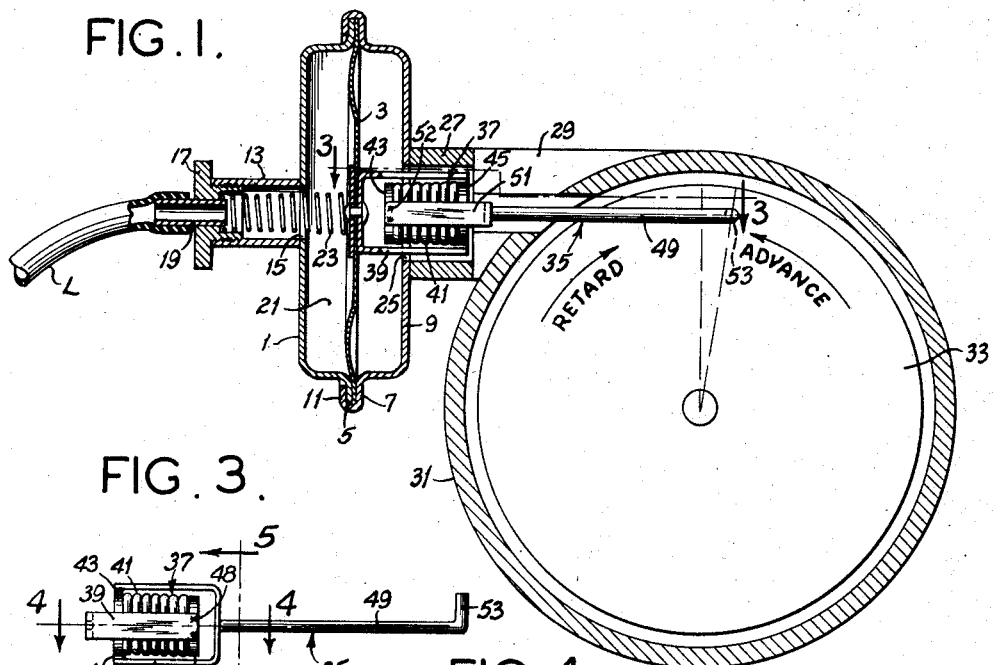
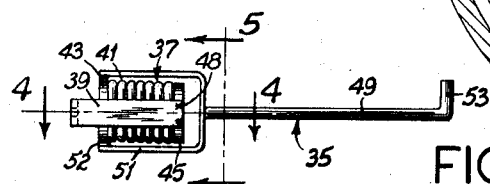
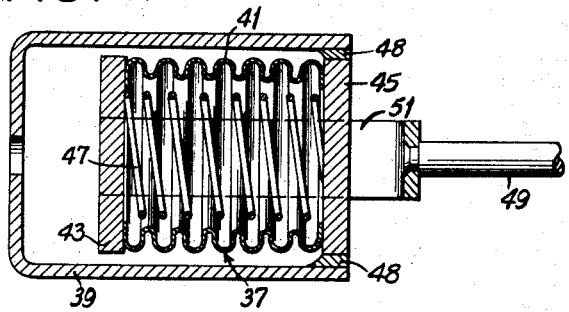
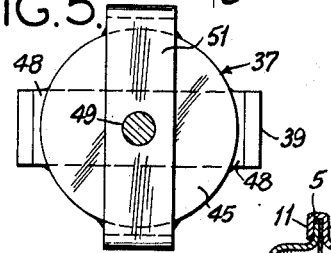
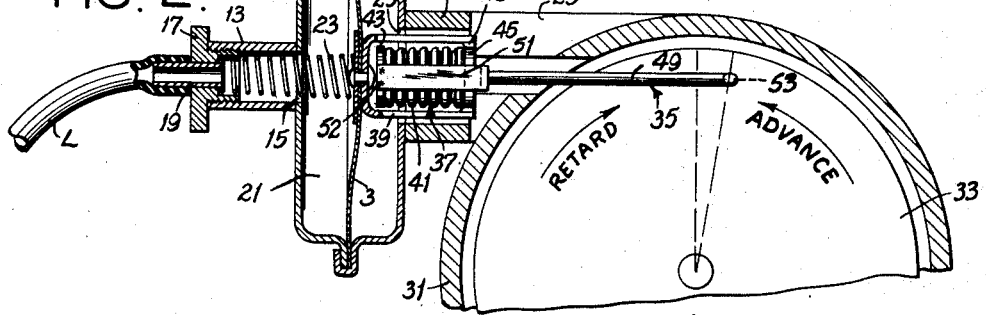
Juan A. Doyen,
Inventor.
Koenig and Pope,
Attorneys.

Patented July 28, 1953

2,646,781

UNITED STATES PATENT OFFICE 2,646,781

VACUUM SPARK CONTROL

Juan A. Doyen, Los Alamos, N. Mex.

Application February 8, 1951, Serial No. 210,067

8 Claims. (Cl. 123—117)

1

This invention relates to vacuum spark controls for internal combustion engine distributors, and more particularly to atmospheric-pressure-compensated controls of this class.

In a conventional type of spark control for internal combustion engine distributors presently in widespread use on automotive vehicles, a vacuum-operated device is provided for actuating a spark advancing and retarding member of the distributor. These devices derive their operating vacuum from the engine. A typical device comprises a flexible diaphragm subject on one side to a partial vacuum derived from the engine and on the other side to atmospheric pressure. The diaphragm is thereby subjected to a force which is dependent upon the partial vacuum, by which is meant the difference between atmospheric pressure and the pressure on the partial-vacuum side of the diaphragm, tending to move the diaphragm in a direction toward its partial-vacuum side. If there is no vacuum, i. e., if there is atmospheric pressure on the vacuum side of the diaphragm as well as on the other side, there is no force tending to move the diaphragm in the direction toward its vacuum side. The diaphragm is biased to move in the opposite direction by a spring, and is coupled to the spark advancing and retarding member of the distributor in such manner as to move the member in spark advancing direction when it moves in the direction toward its vacuum side, and to move the member in spark retarding direction when it moves in the opposite direction. When there is no vacuum, or insufficient vacuum to affect the spring, the diaphragm is moved by the spring to a limiting position in which the spark advancing and retarding member is at its limit of spark retardation. Upon increase of vacuum, i. e., upon decrease of pressure on the vacuum side of the diaphragm below atmospheric pressure, the diaphragm moves in spark advancing direction against the bias of the spring.

These prior devices, however, do not take into account the effect of changes in atmospheric pressure, such as result from changes in the altitude at which the vehicle is operated. Inasmuch as atmospheric pressure decreases with increase in altitude (approximately 1 inch of mercury for each 1,000 feet of altitude), the effect of an increase in altitude is to reduce the effective movement of the diaphragm. That is, assuming the pressure on the vacuum side of the diaphragm remains constant, upon increase in altitude the atmospheric pressure on the other side of the diaphragm decreases. The result is that there is a decrease in the net force tending

2 to move the diaphragm in spark advancing direction. This may result in undesirable retardation of the spark as a vehicle travels from lower to higher altitude, and, conversely, in undesirable advance of the spark as the vehicle travels from higher to lower altitude.

One object of this invention is the provision of a vacuum spark control which is adapted automatically to compensate for changes in atmospheric pressure such as result from changes in altitude to avoid undesirable spark retardation or advance. For example, where a prior control was affected by an increase in altitude in such manner as undesirably to retard the spark, a control embodying this invention may be used to eliminate such retardation.

It is also known that the air-fuel mixture supplied to the engine changes with change in altitude and the device of the present invention may be constructed, if desired, to effect a further compensation in spark setting to obtain a more desirable timing of the spark for any changed air-fuel ratio.

In general, a vacuum spark control of this invention comprises an expansible chamber device having a movable member subject on one side to vacuum and on the other to atmospheric pressure. To this member is coupled a variable-length link, which at its other end is connected to the spark advancing and retarding member of a conventional distributor. The length of this link is controlled by means which acts in response to changes in atmospheric pressure to change the effective length of the link. How this functions to compensate for change in atmospheric pressure to avoid undesirable spark retardation or advance will be made clear in the ensuing detailed description. Also, other features will be in part apparent and in part pointed out hereinafter.

The invention accordingly comprises the elements and combinations of elements, features of of construction, and arrangements of parts which will be exemplified in the structures hereinafter described, and the scope of the application of which will be indicated in the following claims.

In the accompanying drawings, in which one of various possible embodiments of the invention is illustrated, Fig. 1 is a view in section showing a vacuum spark control embodying the invention, as applied to a conventional distributor;

Fig. 2 is a view similar to Fig. 1 illustrating a moved position of certain parts;

Fig. 3 is a view of a variable-length link per se of the invention viewed from line 3—3 of Fig. 1;

Fig. 4 is an enlarged section taken on line 4—4 of Fig. 3; and,

Fig. 5 is a section taken on line 5—5 of Fig. 3.

Similar reference characters indicate corresponding parts throughout the several views of the drawings.

Referring to the drawing, a specific embodiment of the invention is shown to comprise an expansible chamber device consisting of a cup-shaped case 1 closed by a flexible diaphragm 3. The diaphragm is the movable member of the expansible chamber device, and is subject on its right hand side as viewed in the drawing to atmospheric pressure, and on its left hand side to vacuum derived from the engine of the vehicle with which the invention is used. The case 1 has a rim 5, and the diaphragm is peripherally clamped between this rim and the rim 7 of a cup-shaped cap 9. The rim 7 is crimped around the rim 5 as indicated at 11. The case 1 has a tubular extension 13 from an opening 15 in its base. The extension 13 has a head 17 at its outer end. In this end is a nipple 19 for connection of one end of a vacuum line L. The other end of this vacuum line is connected to the intake of the engine for drawing a vacuum in the vacuum chamber 21 defined by the case 1 and the diaphragm 3. The diaphragm is biased outward (toward the right as viewed in Figs. 1 and 2) by a compression spring 23 reacting from the head 17 against the center of the diaphragm. The cap 9 has a central opening 25 and a tubular extension 27 from the opening, the extension being open to atmosphere and having a bracket 29 for attaching the case 1 to the distributor 31 of the engine.

The distributor 31 is shown as having a spark advancing and retarding member or control consisting of a rotary plate 33. This advances the spark when rotated counterclockwise as viewed in Figs. 1 and 2 and retards the spark when rotated clockwise as viewed in Figs. 1 and 2. The distributor is a conventional item, and further details of its construction are not essential as regards this invention, hence are omitted.

The diaphragm 3 is coupled to the rotary plate 33 by a variable-length link generally designated 35. This link includes means acting in response to decrease in atmospheric pressure to shorten it, and in response to increase in atmospheric pressure to lengthen it. This means comprises an expansible and contractible atmospheric-pressure-responsive element generally designated 37. More particularly, the link includes a rigid element consisting of a fork 39 attached to the outside of the diaphragm at its center with the arms of the fork extending outward from the diaphragm into the tubular extension 27 of the cap 9. The element 37 comprises a partially evacuated bellows 41, made of thin metal, for example, and having end heads 43 and 45, and containing a compression spring 47 compressed between the end heads and tending to expand the bellows. The spring 47 is preferably made of a metal which has a low thermal coefficient of expansion so that its length is not materially affected by heat.

The bellows is positioned within the fork 39 lengthwise, with its end head 43 adjacent the diaphragm, and with its end head 45 located between and attached to the outer ends of the arms of the fork 39 as indicated at 48. Thus, fork 39 straddles the bellows endwise from the end of the bellows toward the diaphragm, and the bellows extends axially from the outer end of the fork toward the diaphragm. The link 35 further includes a second rigid element consisting of a rod 49 having a fork 51 at one end which is opposed to the fork 39 and in a plane at right angles to the fork 39, and which straddles the bellows endwise from its outer end (i. e., its end away from the diaphragm). The arms of fork 51 reach to the inner end head 43 of the bellows and are attached thereto as indicated at 52. The rod 49 has a finger 53 at its other end by means of which it is coupled to the rotary plate 33 of the distributor 31. The bellows is stiff enough to transmit force from the diaphragm to the plate 33 without undue expansion or contraction.

As illustrated in the drawing, the arrangement is such that, assuming that the length of the element 37 remains unchanged, upon movement to the right of the diaphragm 3, link 35 is pushed to the right and rotates plate 33 in spark retarding direction. Upon movement to the left of the diaphragm, link 35 is pulled to the left, and rotates plate 33 in spark advancing direction. The diaphragm moves to the right (or outward) under the bias of spring 23 upon decrease of vacuum in vacuum chamber 21, and moves to the left (or inward) against the bias of spring 23 upon increase of vacuum (reduction in pressure) in the chamber 21. The element 37 expands upon decrease in the ambient atmospheric pressure, thereby to shorten the link 35, and contracts upon increase in ambient atmospheric pressure, thereby to lengthen the link 35.

The length-pressure characteristic of the element 37 may be made such as substantially exactly to compensate for changes in vacuum in the vacuum chamber 21 resulting from changes in atmospheric pressure, particularly such changes as result from changes in altitude. Thus, noting that the effect of an increase in altitude (reduction of atmospheric pressure) is to decrease the vacuum in chamber 21, which has the effect of causing the diaphragm to move outward (or to the right) under the bias of spring 23, coupled with this there may be such an expansion of element 37 in response to the decrease in atmospheric pressure as to shorten the link 35 to such an extent that the finger 53 at the outer end of the rod remains substantially stationary. Thus the spark is not changed in response to atmospheric changes, as would otherwise occur if the link 35 were simply a rigid link.

This will be clear from a comparison of Figs. 1 and 2, in which different positions of the diaphragm and different lengths of the element 37 corresponding to differences in atmospheric pressure are shown. Fig. 1, for example, shows the position of parts at a low altitude, and Fig. 2 shows the position of parts resulting from an increase in altitude. It will be seen that due to the decrease in atmospheric pressure resulting from the increase in altitude, the diaphragm has moved outward, which would normally have the effect of moving the rotary plate 33 clockwise in spark retarding direction, but since the element 37 has simultaneously lengthened an amount substantially equal to the distance that the diaphragm moved outward, the net effect has been to shorten the link 35 to such an extent that the finger 53 has remained substantially stationary. This is illustrated by the showing in Figs. 1 and 2 of the angle subtended by a radius normal to the rod 49 and a radius through the finger 53, it being apparent that this angle is substantially the same in Fig. 2 as in Fig. 1.

In response to a decrease in altitude, which has the effect of increasing the vacuum in chamber 21 so that diaphragm 3 moves to the left against the bias of spring 23, the element 37 contracts in length due to the increase in atmospheric pressure. This has the effect of lengthening the effective length of the link 35 so that, again, the finger 53 remains substantially stationary.

It will be understood that the element 37 may be made with such a length-pressure characteristic (spring rate) that instead of exactly compensating for changes in atmospheric pressure, with the net result that the rotary plate 33 remains stationary, the element 37 may be designed to have such a length-pressure characteristic (spring rate) that upon a change in altitude the spark may be advanced or retarded to compensate at least to some extent for the effect upon the change in altitude upon the air-fuel mixture being supplied to the engine.

It will be observed that the member 37 comprises a hermetically sealed expansible bellows member adapted to elongate upon pressure reduction of the ambient atmosphere, and to shorten upon pressure increase of the ambient atmosphere. Obviously, any form of expansible chamber for the purpose is useful.

It will be understood that while the spring 47 itself is desirable, it may be eliminated by incorporating its functions in the bellows itself, i. e., the bellows itself may have expansive spring functions.

In view of the above, it will be seen that the several objects of the invention are achieved and other advantageous results attained.

As many changes could be made in the above constructions without departing from the scope of the invention, it is intended that all matter contained in the above description or shown in the accompanying drawing shall be interpreted as illustrative and not in a limiting sense.

I claim:

1. A vacuum spark control comprising an expansible chamber device having a movable member subject on one side to vacuum and on the other to atmospheric pressure, and a variable-length link coupled to the movable member on said other side thereof, said link comprising an evacuated bellows adapted to contract in length upon increase in atmospheric pressure and to expand in length upon decrease in atmospheric pressure, a rigid link element connected to one end of the bellows and extending therefrom beyond the other end of the bellows to a connection with said movable member, and a second rigid link element connected to the said other end of the bellows and extending therefrom beyond the said one end of the bellows.

2. A vacuum spark control comprising an expansible chamber device having a movable member subject on one side to vacuum and on the other to atmospheric pressure, and a variable-length link coupled to the movable member on said other side thereof, said link comprising a fork attached to the movable member, an evacuated bellows having end heads and containing a spring compressed between the end heads and tending to expand the bellows, the end head at one end of the bellows being attached to the ends of the arms of the fork with the fork straddling the bellows endwise from the other end of the bellows, and a rod having a fork at one end opposed to the first mentioned fork straddling the bellows endwise from the said one end of the bellows, the ends of the arms of the second mentioned fork being attached to the end head at the said other end of the bellows.

3. A control as set forth in claim 2 wherein the spring is made of material having a low thermal coefficient of expansion.

4. A variable-length link comprising a fork, an evacuated bellows having end heads and containing a spring compressed between the end heads and tending to expand the bellows, the end head of the bellows at one end thereof being attached to the ends of the arms of the fork with the fork straddling the bellows endwise from the other end of the bellows, and a rod having a fork at one end opposed to the first-mentioned fork straddling the bellows endwise from the said one end of the bellows, the ends of the arms of the second-mentioned fork being attached to the end head at the said other end of the bellows.

5. A variable-length link as set forth in claim 4 wherein the spring is made of material having a low thermal coefficient of expansion.

6. In an ignition system for an internal combustion engine, the system being of the type comprising a distributor having a spark advancing and retarding control movable in one direction to advance the spark and in the opposite direction to retard the spark, and an expansible chamber device having a movable member subject on one side to vacuum derived from the engine and on the other to atmospheric pressure for actuating said spark advancing and retarding control, the improvement comprising the provision of a variable-length link fixed at one end to said other side of the movable member and at its other end to said spark advancing and retarding control, said link including means acting in response to changes in atmospheric pressure to change the length of the link to avoid undesirable spark retardation or advance such as would otherwise result from changes in atmospheric pressure.

7. In an ignition system for an internal combustion engine, the system being of the type comprising a distributor having a spark advancing and retarding control movable in one direction to advance the spark and in the opposite direction to retard the spark, and an expansible chamber device having a movable member subject on one side to vacuum derived from the engine and on the other to atmospheric pressure for actuating said spark advancing and retarding control, the improvement comprising the provision of a variable-length link fixed at one end to said other side of the movable member and at its other end to said spark advancing and retarding control, said link including an expansible and contractible atmospheric-pressure-responsive element acting in response to decrease in atmospheric pressure to shorten the link and acting in response to increase in atmospheric pressure to lengthen the link.

8. In an ignition system for an internal combustion engine, the system being of the type comprising a distributor having a spark advancing and retarding control movable in one direction to advance the spark and in the opposite direction to retard the spark, and an expansible chamber device having a movable member subject on one side to vacuum derived from the engine and on the other to atmospheric pressure for actuating said spark advancing and retarding control, the improvement comprising the provision of a variable-length link fixed at one end to said other side of the movable member and at its other end to said spark advancing and retarding control, said link comprising an evacuated bellows arranged lengthwise with respect to the link and adapted to contract in length upon increase in atmospheric pressure and to expand in length upon decrease in atmospheric pressure, a rigid link element fixed at one end to said movable member and at its other end to the end of the bellows away from said movable member, and a second rigid link element fixed at one end to said control and at its other end to the end of the bellows toward said movable member.

JUAN A. DOYEN.

References Cited in the file of this patent

UNITED STATES PATENTS

| Number | Name | Date |
| --- | --- | --- |
| 701,983 | Yale | June 10, 1902 |
| 716,633 | Hains | Dec. 23, 1902 |
| 2,233,035 | Schweizer | Feb. 25, 1941 |
| 2,333,401 | Woods | Nov. 20, 1943 |
| 2,354,472 | Mallory | July 25, 1944 |
| 2,389,412 | Carlton | Nov. 20, 1945 |
| 2,450,535 | Watson | Oct. 5, 1948 |
| 2,477,233 | Bristol | July 26, 1949 |
| 2,485,186 | Boyle | Oct. 18, 1949 |
| 2,489,419 | Kerfoot | Nov. 29, 1949 |
| 2,493,180 | Ziebolz | Jan. 3, 1950 |

FOREIGN PATENTS

| Number | Country | Date |
| --- | --- | --- |
| 617,638 | Great Britain | Feb. 9, 1949 |